US009223404B1

(12) United States Patent
Ivanchenko

(10) Patent No.: US 9,223,404 B1
(45) Date of Patent: Dec. 29, 2015

(54) SEPARATING FOREGROUND AND BACKGROUND OBJECTS IN CAPTURED IMAGES

(75) Inventor: Volodymyr V. Ivanchenko, Mountain View, CA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 386 days.

(21) Appl. No.: 13/359,777

(22) Filed: Jan. 27, 2012

(51) Int. Cl.
*G06F 3/033* (2013.01)
*G06F 3/01* (2006.01)

(52) U.S. Cl.
CPC . *G06F 3/017* (2013.01); *G06F 3/01* (2013.01)

(58) Field of Classification Search
CPC ............ G06F 3/017; G06F 3/01; H04N 13/02
See application file for complete search history.

(56) References Cited

U.S. PATENT DOCUMENTS

| 8,578,299 | B2 * | 11/2013 | Chen et al. ..................... 715/848 |
| 2006/0215903 | A1 * | 9/2006 | Nishiyama ..................... 382/154 |
| 2010/0220921 | A1 * | 9/2010 | Blake et al. .................... 382/154 |
| 2011/0018795 | A1 * | 1/2011 | Jang .............................. 345/156 |
| 2012/0062558 | A1 * | 3/2012 | Lee et al. ....................... 345/419 |
| 2012/0071239 | A1 * | 3/2012 | Graepel et al. ................. 463/31 |
| 2013/0066526 | A1 * | 3/2013 | Mondragon et al. ............ 701/48 |
| 2013/0147923 | A1 * | 6/2013 | Zhou et al. ...................... 348/47 |
| 2013/0169760 | A1 * | 7/2013 | Watts ............................... 348/47 |
| 2013/0190089 | A1 * | 7/2013 | Wilson et al. .................. 463/36 |

FOREIGN PATENT DOCUMENTS

WO WO 2011123174 A1 * 10/2011

* cited by examiner

*Primary Examiner* — Lixi C Simpson
(74) *Attorney, Agent, or Firm* — Novak Druce Connolly Bove + Quigg LLP

(57) ABSTRACT

Locating features in image information captured by multiple cameras of a computing device can be facilitated by removing background objects from the image information. A distance past which objects should be considered to be background objects is determined, and an amount of disparity for that distance calculated. Any objects having less than that amount of disparity in the image information can be removed, leaving objects that should be treated as foreground objects. An advantage of such an approach is that objects can be determined to be foreground objects even when those objects are only viewable by one of the cameras and disparity information cannot be calculated for those objects from the image information. Such an approach can be combined with other approaches as well to improve accuracy.

24 Claims, 7 Drawing Sheets

SEPARATING FOREGROUND AND BACKGROUND OBJECTS IN CAPTURED IMAGES

BACKGROUND

People are increasingly utilizing portable computing devices to perform various types of tasks. Accordingly, there is a desire to increase the ways in which users can interact with the devices to perform these tasks. One interaction approach that is gaining in popularity includes gesture input. To provide gesture input, a user positions himself or herself in front of a camera or sensor bar and makes a motion with a feature such as the user's hand or arm. A computing device can capture images or sensor data to attempt to recognize the motion. One problem with such analysis is that the device must not only be able to recognize the motion, but the device also must be able to recognize the feature that is to provide the motion, regardless of orientation of the feature, and separate the feature motion from other motions in the background of the images. Such an approach can be computationally expensive, particularly for portable computing devices. The computational needs can result in delayed response, hanging of the device, battery drain, or other such issues.

BRIEF DESCRIPTION OF THE DRAWINGS

Various embodiments in accordance with the present disclosure will be described with reference to the drawings, in which.

DETAILED DESCRIPTION

Figure 1A:
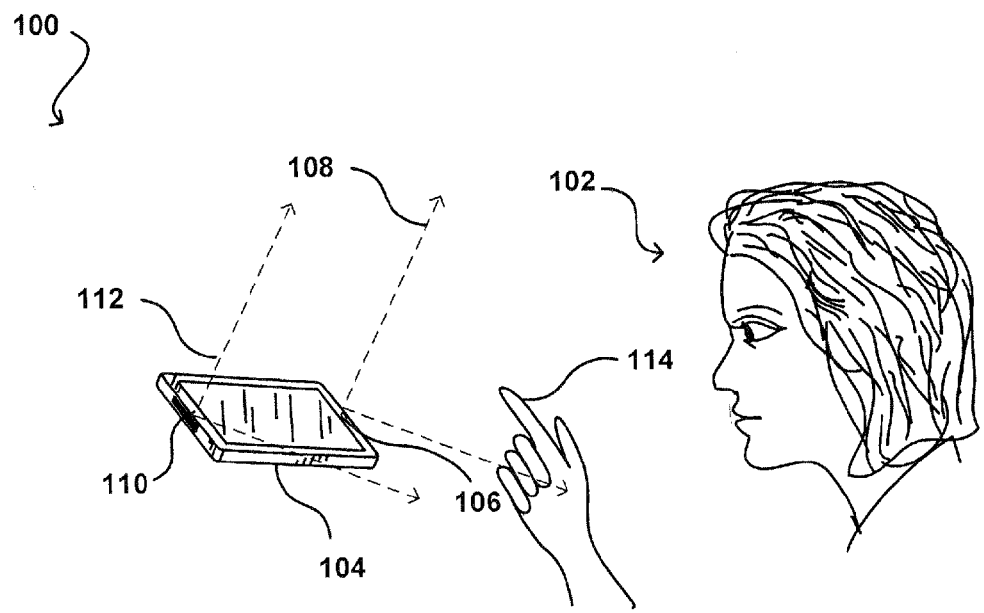
FIGS. 1(a), 1(b), and 1(c) illustrate an interface states enabling a user to enter text through a virtual keyword displayed on a display screen of an electronic device using a conventional technique of the prior art.

Systems and methods in accordance with various embodiments of the present disclosure may overcome one or more of the aforementioned and other deficiencies experienced in conventional approaches to providing input to an electronic device. In particular, various embodiments provide a process for separating foreground and background regions or objects in captured image information that is less resource intensive than conventional approaches. In various embodiments, a pair of cameras can concurrently capture image information from two different perspectives in order to provide, for example, stereo imaging capability. Using stereo imaging for computer vision-based processes avoids certain problems with other approaches, as stereo imaging does not suffer from extreme lighting conditions like infrared radiation-based approaches, and is not affected by motion artifacts like background subtraction approaches. By combining the images from both cameras captured at substantially the same time, an amount of disparity (i.e., horizontal displacement) of each object in the two images can be determined.

While conventional correlation approaches can utilize this information to generate a three-dimensional disparity map to determine which items are in the foreground, such an approach can still be relatively computationally expensive. Approaches in accordance with various embodiments can instead look for those objects that have less than a specified amount of disparity. Objects in the background will have very little disparity between two stereo or disparity images, and small amounts of disparity can be determined without a significant amount of processing. Using such a process, the background objects can be located and removed from the stereo images with relatively little resource consumption, where resources can include items such as processing capacity, storage capacity, memory, bandwidth, battery power, and the like. Reducing the number of disparity levels to be analyzed can also increase the speed of the processing algorithm and process by several times, and the reduced search space can provide significantly higher accuracy since the chance of finding an incorrect image correspondence is reduced. Any remaining objects can be considered to be foreground objects, and fed to a gesture detection algorithm or other such process. These objects can include, for example, a hand or fingertip of a user, moved in two or three dimensions by the user, or used to perform a particular gesture, in order to provide input to a computing device. The relative distance and/or position can be determined and/or tracked, and this information passed to a gesture recognition algorithm or other such process to determine the appropriate input to provide to a processor of the device.

Another advantage of a disparity level-based approach is that the effective blind spots or zones of the stereo cameras can be reduced. In conventional stereo imaging, disparity for an object can only be calculated when the object can be captured concurrently by both cameras. If an object is relatively close to the computing device and can only be seen by one camera, for example, disparity information cannot be calculated and the device would be unable to determine the distance to that object classify it as a foreground or background object. Using approaches discussed herein, objects at a distance would likely be included in image information captured by both cameras or neither camera, as the blind spots of the cameras become a very small fraction of the field of view past a certain distance. If an object is only seen by one camera in accordance with various embodiments, there would be no disparity information so the object would not be removed as being a background object. Accordingly, the object would remain in the image information to be processed by a gesture algorithm (or other such process) as a foreground object.

Various other applications, processes, and uses are presented below with respect to the various embodiments.

Figure 1B:
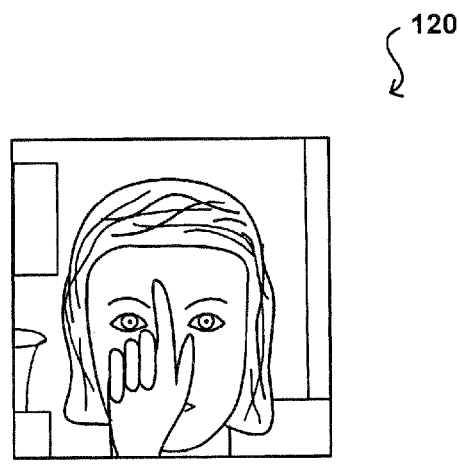
Figure 1C:
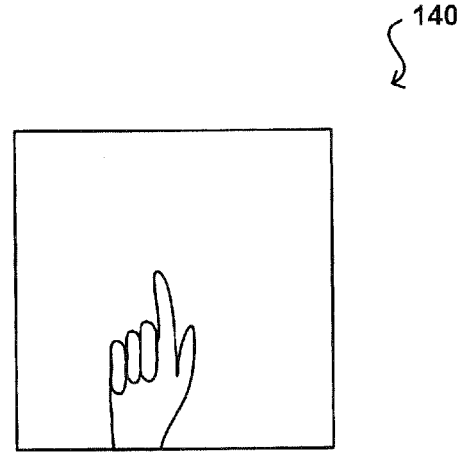

FIG. 1(a) illustrates an example situation 100 wherein a user 102 is attempting to provide gesture or motion input to a computing device 104. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. In this example, the computing device includes a pair of matched cameras 110, 106 having substantially overlapping fields of view 108, 112 and having parallel optical axes in order to enable stereo image capture. It should be understood, however, that there can be additional cameras or alternative sensors or elements in similar or different locations with respect to the device in accordance with various embodiments. When the user 102 wants to provide gesture or motion input to the device, the user can place an appropriate feature, such as the user's fingertip 114, within the field of view 108, 112 of one or more of the cameras. Each camera then will capture an image 120 such as that illustrated in FIG. 1(b), with the finger being slightly offset in the image captured by each camera due to the separation of the cameras. As illustrated, the image can include a variety of other objects, such as the user's face, furniture, pictures, and various other items. In order to recognize gesture input, the device in at least some embodiments must distinguish the hand from the rest of these objects, and recognize the hand as a hand, in order to track motion of the hand with respect to the device. As illustrated, the captured images can include a variety of objects that must be distinguished and separated from the hand, which can require a significant amount of image processing. A less resource-intensive process would be to separate out the hand from the other objects in the image 140, such as illustrated in FIG. 1(c). Once such an image is obtained, performing feature recognition (e.g., image recognition, contour matching, etc.) on the image to recognize or follow the feature in the captured image information (e.g., series of still images or video information) can be significantly simplified.

Figure 2:
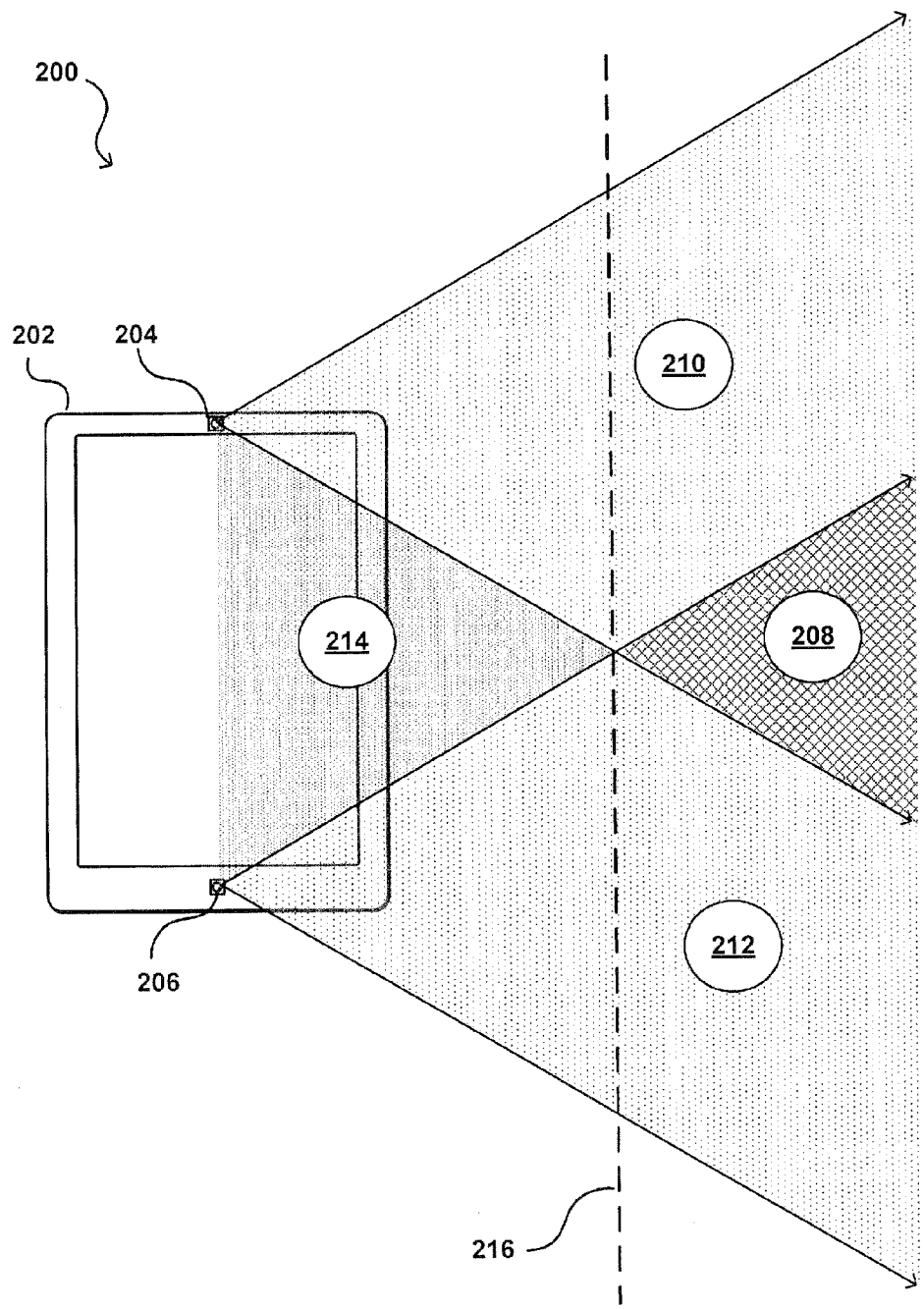
FIG. 2 illustrates example regions viewable by a pair of cameras that can be used in accordance with various embodiments.

As mentioned, stereo imaging can be used to build a full disparity map of the objects in the stereo images, but such an approach can be very resource intensive. Further, when a user is making motions relatively close to the device, the feature making the motion might not be able to be seen by both cameras, which can prevent the object from being properly included in the disparity map. For example, FIG. 2 illustrates an example situation 200 where a pair of matched cameras 204, 206 of a computing device 202 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 208 or region that is a distance from the device 202. Using conventional stereo imaging approaches, anything closer to the device than this overlap zone 208 will not be able to have disparity information determined, as the object would be seen by at most one of the cameras. An object in a zone 214 close to the device and between the cameras 204, 206 will not be seen by either camera and thus cannot be included in the disparity information (unless estimated from previous measurements and motion tracking, for example). There are two zones 210, 212 where an object can only be seen by one of the cameras 204, 206. Again, disparity information cannot be calculated for items in either of these zones. As discussed, the effect of these zones decreases with distance, such that past a certain distance (e.g., a meter or so for certain devices) the fields of view of the cameras substantially overlap. Using approaches in accordance with various embodiments, objects in the single camera zones 210, 212 can be designated as foreground objects even though disparity information cannot be calculated, as any background objects would appear in both camera images due to the overlapping fields of view at those distances, and the relatively small disparity that could then be calculated.

Figure 3A:
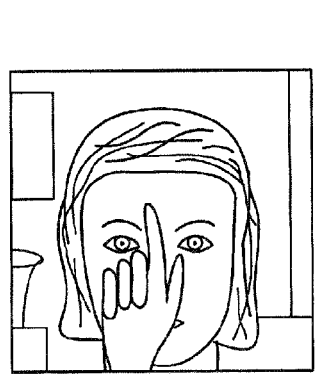
FIGS. 3(a), 3(b), and 3(c) illustrate example images that can be analyzed in accordance with various embodiments.
Figure 3B:
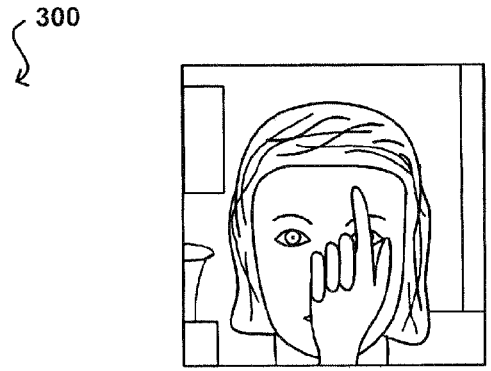
Figure 3C:

Systems and methods in accordance with various embodiments can take advantage of the relationship between disparity and distance to separate foreground images from background images without the need to generate a full disparity map or otherwise fully process both images. For example, FIGS. 3(a) and 3(b) illustrate images 300, 320 that could be captured using stereo cameras. FIG. 3(c) illustrates an example combination image 340 showing the relative position of various objects in the captured images 300, 320. As illustrated, objects closest to the camera, such as the user's hand, have the greatest amount of disparity, or horizontal offset between images. Objects in the background, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

Figure 4:
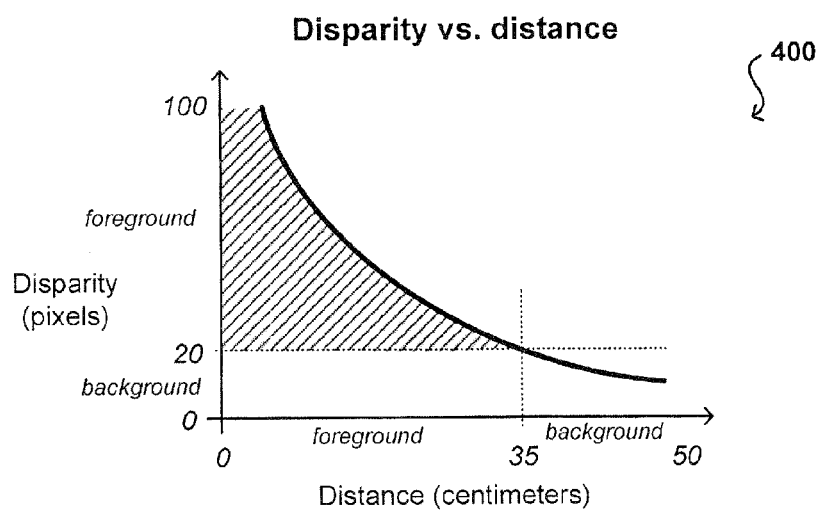
FIG. 4 illustrates an example plot of disparity versus distance that can be leveraged in accordance with various embodiments.

FIG. 4 illustrates an example plot 400 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can select a distance past which objects are to be considered background objects, which can correspond to a small number of disparity levels to be analyzed. For example, a user providing motion input for a virtual keyboard of a smart phone might typically provide input within thirty-five centimeters of the device. Accordingly, the device for that application might set a threshold of thirty-five centimeters for background separation. By examining the disparity relationship curve 400 or relationship, the device (or an application or user of the device) can determine that the amount of disparity at thirty-five centimeters for the configuration parameters of the current device (e.g., camera resolution, camera separation, field of view, etc.) is twenty pixels of separation between images. Using this information, the device can analyze objects in the stereo images, and any objects having twenty pixels of disparity or less can be removed from the images as background images. Any remaining images can be left in the images as foreground images. As illustrated in the FIG. 4, the fewer levels of disparity for the background objects can significantly reduce that the amount of processing of the image that is needed. Although likely more processor intensive, and likely to exclude features seen only by a single camera, another approach would be to select portions of the image that have more than the threshold amount of disparity as foreground images. Various other such approaches can be used as well.

In one example, an application can designate that anything within one meter of the device should be determined to be a foreground object. In another embodiment, an application can determine the distance to a feature of the user and make some factor of that distance, such as 1.25x, the distance cutoff. The actual value of the disparity threshold then can be calculated using that designation with information about the computing device capturing the image information. For example, the amount of disparity, D, at a given distance, d, can be given by:

$$D = \frac{fxB}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. For any object in the images that has a disparity of less than twenty pixels, that object can be considered a background object and removed from the image information. In at least some embodiments, "removing" an object from an image means setting a color, intensity, chroma, or other such value to a common value such as zero or another such value, whereby the background regions can readily be removed from consideration by a feature recognition process, gesture recognition process, etc.

Figure 5A:
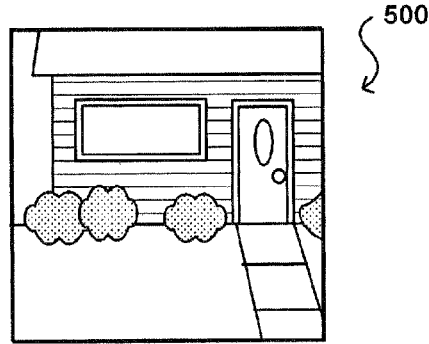
FIGS. 5(a), 5(b), 5(c), 5(d), 5(e), and 5(f) illustrate example images that can be processed in accordance with various embodiments.
Figure 5B:
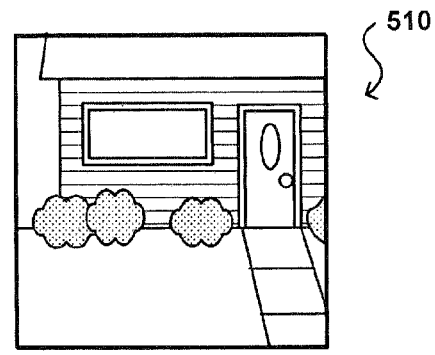
Figure 5C:
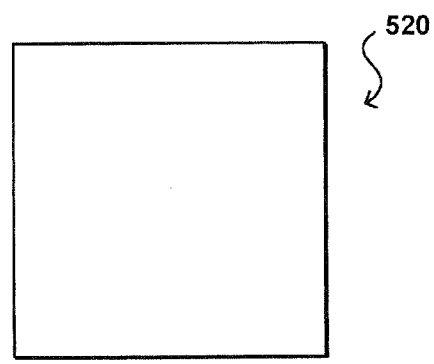
Figure 5D:
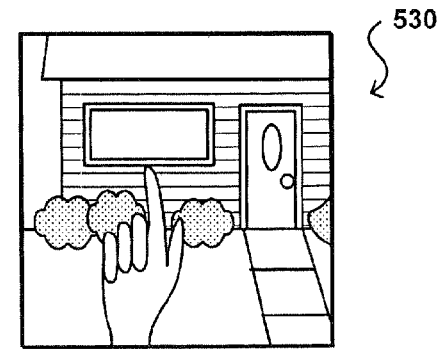
Figure 5E:
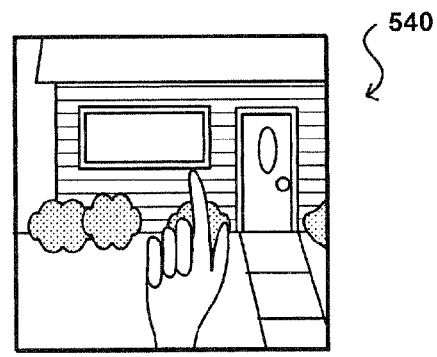
Figure 5F:
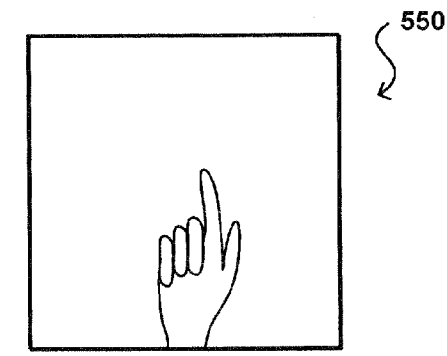

FIGS. 5(a)-5(f) illustrate an application of such an approach to stereo or disparity images. For example, FIGS. 5(a) and 5(b) illustrate images 500, 510 captured by stereo cameras where the objects in the images are all in the background, but slightly offset due to the small amount of disparity at that distance. By applying a background object disparity cutoff or threshold, all objects in these images will be designated as background objects and removed from the images, such that when the images are combined there is nothing in the stereo image 520 as illustrated in FIG. 5(c). In FIGS. 5(d) and 5(e), the user's hand is placed in front of the cameras in the captured images 530, 540 inside the disparity threshold, such that when the background objects are removed and the images combined to a stereo image 550, only the hand will be displayed as illustrated in FIG. 5(f). Similarly, if the hand had only been seen in one image, such as the image 540 of FIG. 5(e) and the other image had not shown the hand, as in the image 510 of FIG. 5(b), the background objects would still be subtracted out and the hand left in, such that the combined stereo image 550 would still include the hand as illustrated in FIG. 5(f). There would be no disparity information for the hand in the combined image when the hand was only captured by one camera, but the motion of the hand can still be monitored to attempt to recognize gestures or motions performed by the hand.

Figure 6:
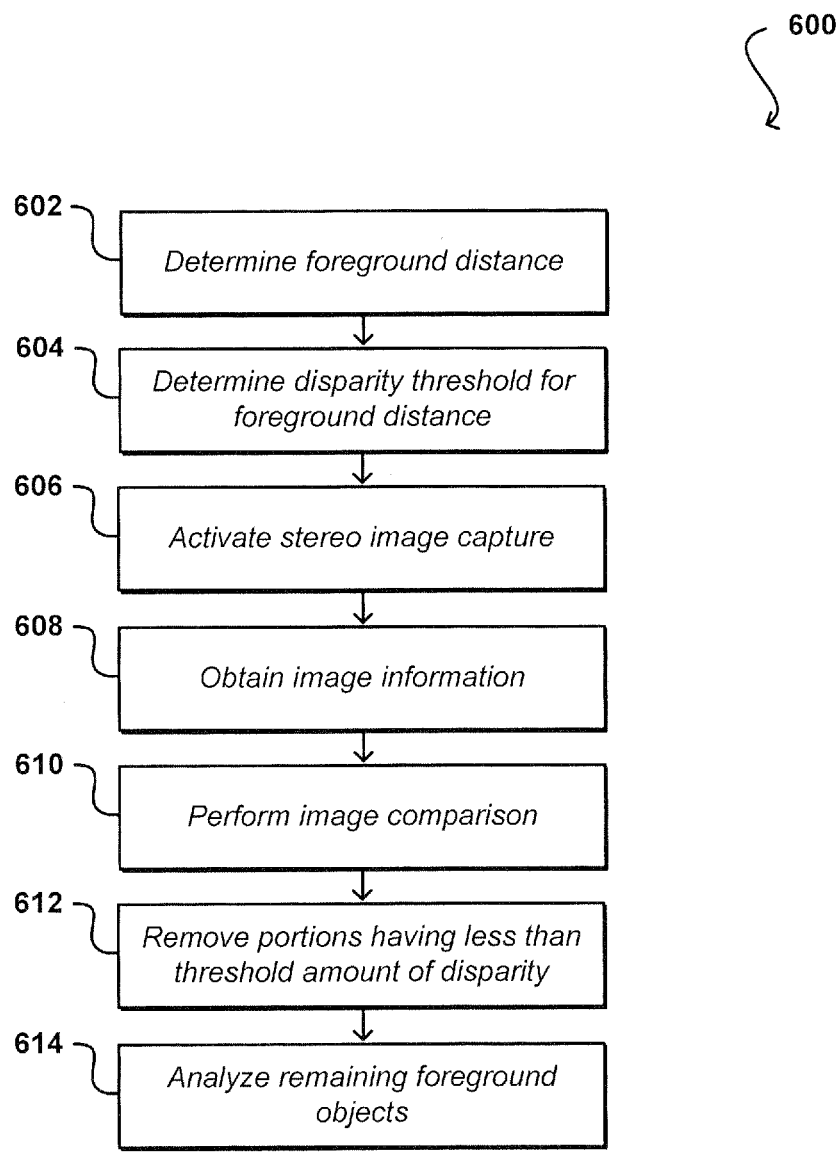
FIG. 6 illustrates an example process for separating foreground objects from background objects that can be used in accordance with various embodiments.

FIG. 6 illustrates an example process 600 for separating foreground objects from background objects in image information that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a foreground distance within which objects will be considered to be foreground objects is determined 602. This process can be performed by a user, developer, or other appropriate party at, after, or before a time of image capture. The distances can vary by user, device, application, and other such aspects as discussed elsewhere herein. The distances might be static for an application, or determined dynamically, such as may be based upon a determined distance to a user. Various other approaches can be used as well as discussed elsewhere herein. For the computing device capturing the information, configuration data can be obtained that can include information such as the resolution and field of view of each camera, a separation of the cameras, and other such information. Based at least in part upon this information, a disparity threshold for the device can be determined 604 for the selected foreground distance. As discussed, this disparity threshold can specify a maximum amount of pixel shift of an object between stereo images of the same point in time, or other such measure of disparity. It should be understood that the disparity calculation also can be done at or near a time of analysis, before user access at a time of manufacture or configuration, or any other appropriate time.

When a process or application utilizing foreground object information is utilized, for example, stereo image capture can be activated 606 on the computing device. The application, process, and/or capture can be activated manually by a user or automatically in response to any of a variety of events. In at least some embodiments, the cameras or sensors to be used for image capture can be selected dynamically at or near a time of image capture, such as may be in response to an orientation of the device, a relative position of the user, or other such information. As part of the stereo image capture, image information will be obtained 608 that includes information captured concurrently from both cameras, which can include a series of still images or length of video information. Using an appropriate disparity determination algorithm or process, the image information can be compared 610 or otherwise analyzed to attempt to locate areas or objects in the images that have less than (or up to) the determined disparity threshold. Portions or objects having less than the threshold amount of disparity can be removed 612 from the image information. The remaining portions of the image can be considered to correspond to foreground objects, and these objects can be analyzed 614 using an appropriate process or algorithm for the current application or purpose on the computing device. For example, in the case of a gesture recognition process a gesture recognition algorithm can be run on a series of images or length of video having the background objects removed, in order to recognize the appropriate feature of the user and track that feature over time to attempt to recognize one or more input gestures. Various other applications, purposes, or algorithms can be used as well as discussed or suggested elsewhere herein.

Such stereo imaging approaches may not be sufficient for all conditions, however. For example, stereo imaging typically requires a minimum amount of contrast in order to be able to correlate the objects in the images captured from each camera. Accordingly, approaches in accordance with various embodiments can utilize a combination of approaches to account for varying environmental conditions. For example, a computing device might use a light sensor or other such component to determine an amount of light and/or image contrast near the computing device. If a sufficient amount of contrast is present, the device can utilize a stereo imaging approach. If there is not a sufficient amount of contrast, however, the device can attempt to use an alternative (or additional) approach to recognizing and tracking foreground objects for purposes such as gesture recognition, facial recognition, and the like.

For example, a device can utilize infrared radiation (IR) to attempt to separate foreground features from background features in at least some embodiments, where the device can capture one image while emitting IR radiation and another image without IR radiation. Objects in the foreground will show stronger differences as a result of the illumination between figures, which can facilitate the identification of foreground objects. Examples of such approaches can be found, for example, in co-pending U.S. patent application Ser. No. 13/172,727, filed Jun. 29, 2011, and entitled "User Identification by Gesture Recognition," which is hereby incorporated herein by reference. IR-based approaches can suffer from motion effects, however, as the images are captured at different points in time. Stereo imaging captures image information at the same time, such that there is little to no effect due to motion, other than blur or other such effects. IR-based approaches can produce relatively crisp images, even when there is an amount of motion, but do not work well in bright sunlight, where stereo imaging tends to perform well. IR-based approaches work well up to thirty centimeters, for example, but stereo approaches work for longer distances, such as up to three meters, but have blind zones when very close to the device. Stereo and IR based approaches thus complement each other, and can be used together advantageously in at least some embodiments for at least a certain range of conditions. Thus, a device can attempt to determine one or more environmental conditions, such as an amount of light or motion, and can select to use a stereo based approach or an IR based approach, or a combination of both. An advantage to using a combination of approaches is that each individual approach might only give a result with 80% confidence, but using them together can result in a confidence of about 96 percent in at least some embodiments.

In at least some embodiments, gesture recognition or feature tracking can be performed with relatively low resolution or low power cameras or sensors. In some embodiments, a camera can run in full or a higher resolution mode until a feature is identified, such as to identify the hand of the user through image analysis, after which time a lower resolution mode can be used to track the feature, at least until such point as the feature passes outside the view of the camera, at which point the camera might have to return to a higher resolution mode in order to recognize the feature when brought back within the field of view.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features. For approaches such as IR-based approaches that suffer from motion effects, such information can help to correlate objects in the images captured at different times.

Figure 7:
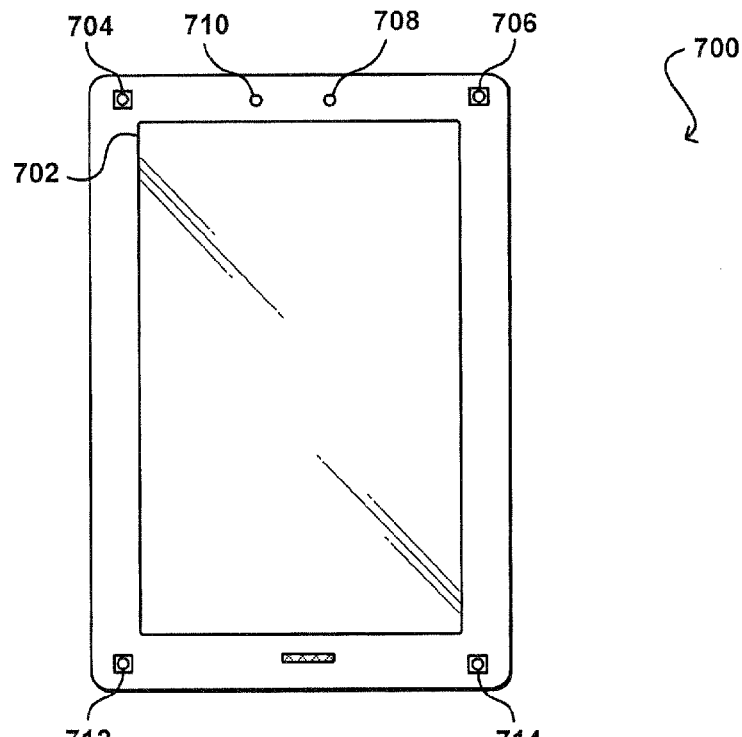
FIG. 7 illustrates an example computing device that can be used in accordance with various embodiments.

FIG. 7 illustrates an example computing device 700 that can be used to perform methods in accordance with various embodiments discussed and suggested herein. In this example, the device has four image capture elements 704, 706, 712, 714 positioned at various locations on the same side of the device as a display element 702, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 8:
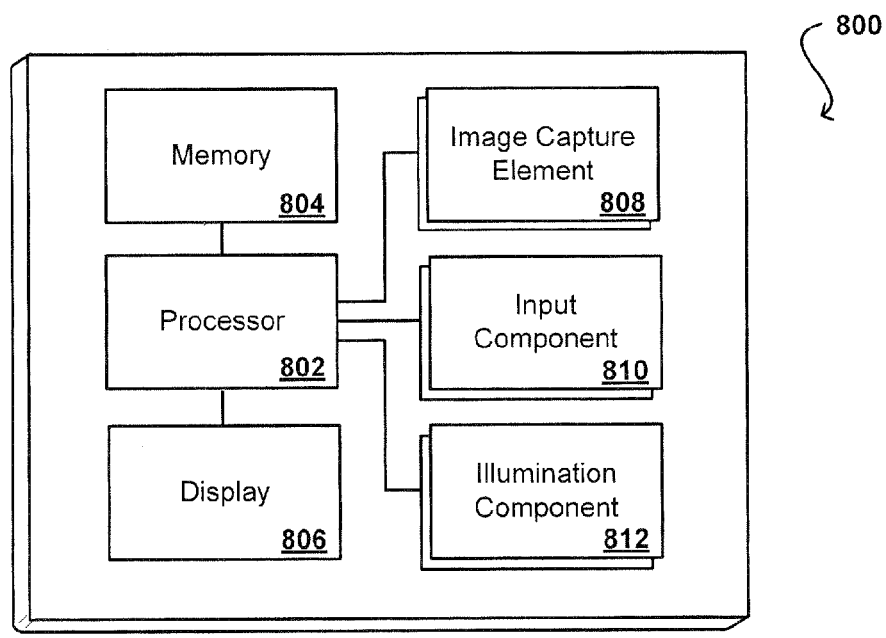
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 810, such as an electronic gyroscope used to determine motion of the device for assistance in input determination. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
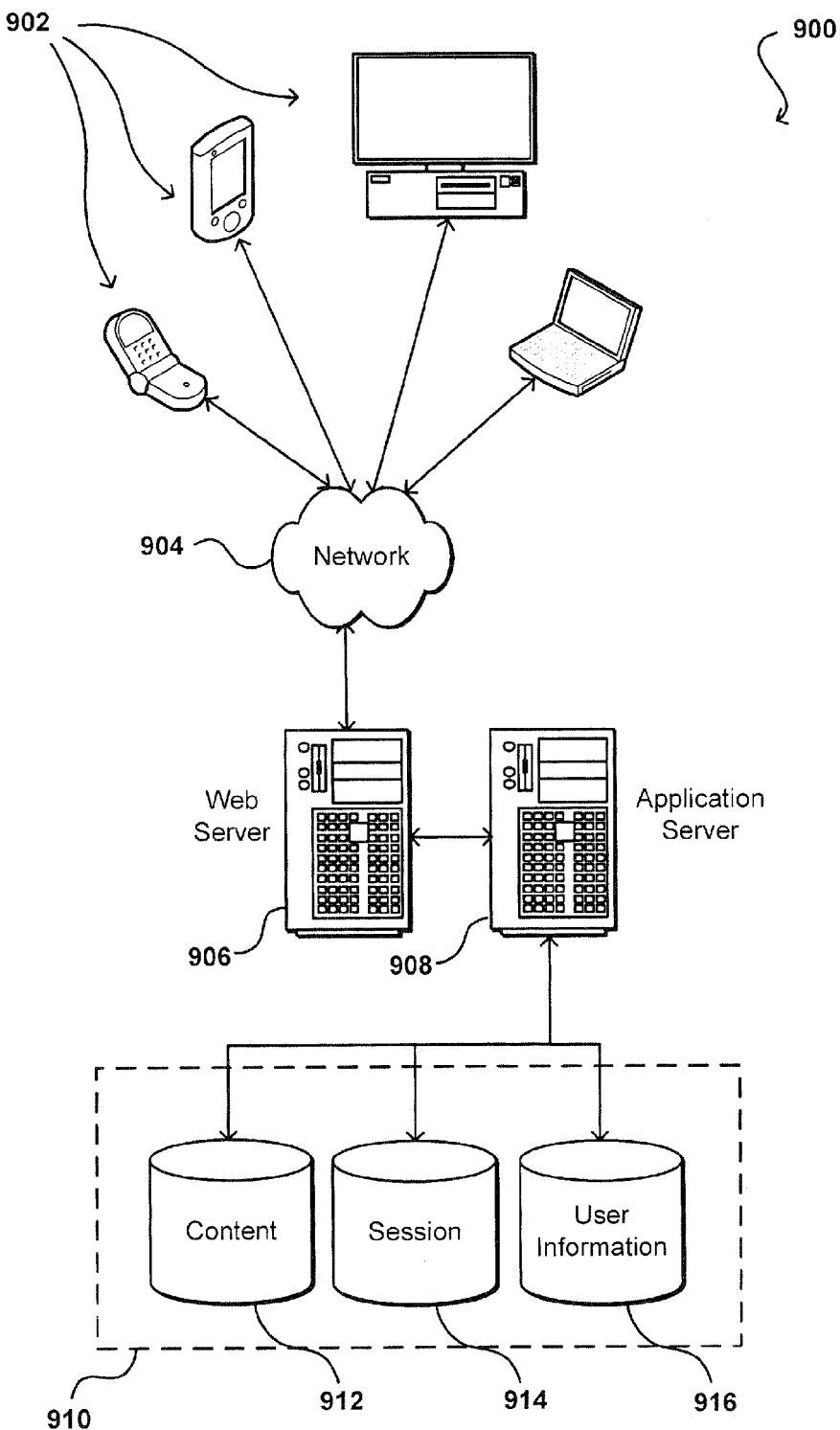
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling gesture input to a computing device, comprising:
    setting a threshold number of pixels for a processor of the computing device to differentiate background objects from foreground objects;
    capturing image information using a pair of cameras of the computing device configured for stereoscopic image capture, a first camera of the pair of cameras capturing a first set of the image information and a second camera of the pair of cameras capturing a second set of the image information;
    analyzing the image information, using the processor of the computing device and the threshold number of pixels set prior to capturing image information, to determine that a first object is a background object where a difference in position between a first location of a reference point on the first object in the first set of image information and a second location of a corresponding reference point on the first object in the second set of image information represents less than the threshold number of pixels;
    determining that a second object in the image information is one or more foreground objects where a difference in position between a first location of a reference point on the second object in the first set of image information and a second location of a corresponding reference point on the second object in the second set of image information is at least the threshold number of pixels; and
    providing the image information that includes the second object to at least one gesture recognition process, the second object including one or more foreground objects.

2. The computer-implemented method of claim 1, further comprising:
    adjusting at least one color value of a portion of the image corresponding to the background object to a predetermined background value.

3. The computer-implemented method of claim 1, further comprising:
    analyzing the image information that includes the second object to locate a feature of a user of the device capable of providing gesture input.

4. The computer-implemented method of claim 3, further comprising:
    locating the feature of the user in image information that includes the second object captured over a period of time in order to track movement of the feature while performing a gesture.

5. The computer-implemented method of claim 1, further comprising:
    multiplying a focal length of one of the first camera or the second camera by a baseline of one of the first camera or the second camera to generate a first result; and
    dividing the first result by the distance past which objects are considered background objects to generate the threshold number of pixels.

6. A computer-implemented method of identifying foreground objects in captured image information, comprising:

setting a threshold number of pixels for a processor of a computing device to differentiate background objects from foreground objects;

capturing image information using a pair of cameras of the computing device, the pair of cameras including a first camera for capturing a first set of image information and a second camera for capturing a second set of image information;

analyzing the image information, using the threshold number of pixels set prior to capturing the image information, to determine that a first object is a first type of object where a difference in position between a location of a reference point on the first object in the first set of image information and a second location of a corresponding reference point on the first object in the second set of image information represents less than the threshold number of pixels;

determining that a second object in the image information is a second type of object where a difference in position between a first location of a reference point on the second object in the first set of image information and a second location of a corresponding reference point on the second object in the second set of image information is at least the threshold number of pixels; and providing the image information that includes the second object, the second object in the image information corresponding to one or more foreground objects.

7. The computer-implemented method of claim 6, wherein the portion of the image information includes at least one feature of a user operable to provide motion or gesture input to the computing device.

8. The computer-implemented method of claim 6, further comprising:

processing the captured image information to remove at least one of noise or artifacts from the captured image information.

9. The computer-implemented method of claim 6, wherein the image information that includes the second object has a disparity greater than the threshold amount of disparity or has a disparity that is undeterminable from the captured stereoscopic image information.

10. The computer-implemented method of claim 6, further comprising:

determining a distance from the computing device past which objects are to be classified as background objects.

11. The computer-implemented method of claim 10, further comprising:

calculating the specified amount of disparity using at least the determined distance and configuration information for the pair of cameras.

12. The computer-implemented method of claim 6, wherein the computing device includes at least three cameras, and wherein the pair of cameras is selected from the at least three cameras based on at least one environmental condition.

13. The computer-implemented method of claim 12, wherein the at least one environmental condition includes at least one of an orientation of the computing device, a relative orientation of a user, an amount of light, or an amount of motion of the device.

14. The computer-implemented method of claim 6, further comprising:

detecting an amount of light; and selectively activating an illumination element during stereoscopic image capture based at least in part upon the detected amount of light.

15. The computer-implemented method of claim 6, further comprising:

determining at least one environmental condition, a value of the environmental condition determining whether to activate infrared imaging on the computing device.

16. The computer-implemented method of claim 15, wherein the infrared imaging is activated instead of, or in addition to, the capturing of stereoscopic image information, the infrared imaging capable of selectively providing infrared illumination to separate one or more foreground objects captured by the infrared imaging.

17. The computer-implemented method of claim 16, further comprising:

determining an amount of motion between infrared image capture instances using at least one sensor of the computing device, the amount of motion capable of being used to offset positions of one or more objects in captured infrared images for the infrared image capture instances.

18. A computing device, comprising:

a device processor;

a pair of cameras; and a memory device including instructions operable to be executed by the processor to perform a set of actions, enabling the computing device to:

set a threshold number of pixels for the device processor of the computing device to differentiate background objects from foreground objects;

capture stereoscopic image information using the pair of cameras, the image information comprising a first set of image information captured by a first camera of the pair of cameras and a second set of image information captured by a second camera of the pair of cameras;

analyzing the stereoscopic image information, using the threshold number of pixels set prior to the capture of the stereoscopic image information, to determine that a first object is a background object in the stereoscopic image information where a difference in position between a first location of a reference point on the first object in the first set of image information and a second location of a corresponding reference point on the first object in the second set of image information represents less than the threshold number of pixels;

determine that a second object in the image information is a foreground object where a difference in position between a first location of a reference point on the second object in the first set of image information and a second location of a corresponding reference point on the second object in the second set of image information is at least the threshold number of pixels; and adjust color values for the background object region to a specified background color value, wherein the captured image information after adjusting including the second object is provided for analysis.

19. The computing device of claim 18, wherein the instructions when executed further cause the computing device to:

determine a distance from the computing device past which objects are to be classified as background objects;

calculate the threshold amount of disparity using at least the determined distance and configuration information for the pair of cameras.

20. The computing device of claim 18, wherein the instructions when executed further cause the computing device to:

detect an amount of light; and selectively activate an illumination element during image capture based at least in part upon the detected amount of light.

21. The computing device of claim 18, wherein the instructions when executed further cause the computing device to:

activate infrared imaging on the computing device, the infrared imaging being activated instead of, or in addition to, the capturing of image information, the infrared imaging capable of selectively providing infrared illumination to separate one or more foreground objects captured by the infrared imaging.

22. A non-transitory computer-readable storage medium storing instructions that, when executed by at least one processor of a computing device, cause the computing device to:

set a threshold number of pixels for the at least one processor of the computing device to differentiate background objects from foreground objects;

capture image information using a pair of cameras of the computing device, the image information comprising a first set of image information captured by a first camera of the pair of cameras and a second set of image information captured by a second camera of the pair of cameras;

analyze the image information, using the at least one processor of the computing device and the threshold number of pixels set prior to the capture of the image information, to locate background objects in the image information that correspond to less than the threshold number of pixels in difference between a first location of a reference point on a first object in the first set of image information and a second location of a reference point on the first object in the second set of the image information;

adjust portions of the image information corresponding to the background objects to correspond to a background setting to provide adjusted image information; and provide the adjusted image information after the adjustment to a feature recognition process, the adjusted image information including a remaining region determined to correspond to foreground objects to be processed using the feature recognition process, the remaining region having one or more of the foreground objects; the one or more foreground objects determined to have at least the threshold number of pixels between the first set of image information and the second set of image information.

23. The non-transitory computer-readable storage medium of claim 22, wherein the adjusted image information has greater than the threshold number of pixels or an indeterminable corresponding disparity value from the captured image information.

24. The non-transitory computer-readable storage medium of claim 22, wherein the instructions when executed further cause the computing device to:

determine a distance from the computing device past which objects are to be classified as background objects;

calculate the threshold amount of disparity using at least the determined distance and configuration information for the pair of cameras.

\* \* \* \* \*